US008813915B2

(12) United States Patent
Chio (10) Patent No.: US 8,813,915 B2
(45) Date of Patent: Aug. 26, 2014

(54) ENERGY STORING DEVICE IN WHICH ENERGY IS STORED THROUGH SPRING TORSION

(76) Inventor: Chuy-Nan Chio, Taipei (TW)

(*) Notice: Subject to any disclaimer, the term of this patent is extended or adjusted under 35 U.S.C. 154(b) by 49 days.

(21) Appl. No.: 13/589,604

(22) Filed: Aug. 20, 2012

(65) Prior Publication Data

US 2014/0049050 A1 Feb. 20, 2014

(51) Int. Cl.
*F16C 1/00* (2006.01)

(52) U.S. Cl.
USPC .................................. 185/37; 185/10; 185/39

(58) Field of Classification Search
CPC ............. F03G 1/00; F03G 1/02; F03G 1/06; F03G 1/08; F03G 2730/00; F03G 2730/03
USPC ................... 185/37, 39, 43, 45, 10
See application file for complete search history.

(56) References Cited

U.S. PATENT DOCUMENTS

| 1,075,023 | A | * | 10/1913 | Creech | 185/37 |
|---|---|---|---|---|---|
| 1,839,744 | A | * | 1/1932 | Drucker | 185/37 |
| 2,617,248 | A | * | 11/1952 | Brown | 368/144 |
| 3,363,891 | A | * | 1/1968 | Foster | 267/156 |
| 4,776,574 | A | * | 10/1988 | Krambeck | 267/156 |
| 5,358,073 | A | * | 10/1994 | Wothrich | 185/43 |
| 5,809,697 | A | * | 9/1998 | Chen | 49/386 |
| 6,523,646 | B1 | * | 2/2003 | Gates | 185/37 |
| 6,880,677 | B2 | * | 4/2005 | Chio | 185/38 |
| 2012/0114481 | A1 | * | 5/2012 | Benitez Sanchez et al. | 416/1 |

* cited by examiner

*Primary Examiner* — Alan B Waits
(74) *Attorney, Agent, or Firm* — Muncy, Geissler, Olds & Lowe, P.C.

(57) ABSTRACT

An energy storing device is disclosed. In the energy storing device of the present invention, energy from an energy generating unit is stored in the form of spring torsion and then is output steadily. The energy storing device of the present invention includes a plurality of cog-wheels, a plurality of torsion magnitude limiting units, a plurality of single-directional input bearings, a plurality of energy storing units and a plurality of speed enhancing cog-wheels. Each of the energy storing units includes at least two end rotational disc portions, which are connected with each other co-axially. A leaf spring unit is provided between each pair of rotational disc portions and one end of the leaf spring unit is bent in an opposite direction. In addition, the energy storing units may be connected in series or in parallel to increase the efficiencies in energy storage and energy output.

8 Claims, 11 Drawing Sheets

ENERGY STORING DEVICE IN WHICH ENERGY IS STORED THROUGH SPRING TORSION

BACKGROUND OF THE INVENTION

1. Field of the Invention

The invention generally relates to an energy storing device. More particularly, the invention relates to an energy storing device that may receive energy from various types of energy sources, store it through spring torsion and output it.

2. Description of the Prior Art

Because there is only a limited amount of petroleum available in the earth, it will definitely be used up some day in the future. In addition, the control and distribution of petroleum resources have been in the hands of a few countries. Moreover, the combustion or use of petroleum seriously impacts the environment. The development of new energy sources has been an important topic.

In fact, there have been many types of green energy sources, such as solar energy, wind power, hydropower, etc., and these sources will remain available for a long time. However, these types of green energy sources have to be converted into a form that may be used. In addition, they are not stable. For examples, solar energy is not available at night. Wind sometimes is strong and sometimes is weak, and thus, is not stable. Hydropower may becomes unusable during dry seasons. Therefore, a crucial point in the use of a green energy source is that energy should be stored away when it is supplied plentifully, and energy may be output from a device when the output of an energy source dwindles.

Regarding the conversion of energy into a form that may be used, a device that may be used to accomplish such conversion is the invention with the ROC patent number 197,189 (invented by the inventor of the present invention) with the title of "Energy Storing Set In Which Energy Is Stored Through Spring Torsion". Such an energy storing set comprises a casing, energy storing units and a transmission box. The energy storing units and a transmission box are housed in the casing. Each of the energy storing units comprises a longitudinal rod, a plurality of rotational disc portions and a plurality of spiral springs. An outer retaining protrusion and an inner retaining groove are provided on each disc portion. A spiral spring is provided between two disc portions, and the two ends of the spring are retained by the outer retaining protrusion and inner retaining groove. An energy input axle is provided outside the casing and may pass the energy to drive the first rotational disc portion. In addition, the transmission box has an energy input end and an energy output end. The energy output axle sticks out of the casing. Several cog-wheels are provided inside the transmission box and may engage with a rotational disc disposed inside the box. Therefore, in the energy storing set, energy is stored through spring torsion and then may be output steadily.

Such an energy storing set may be used to store energy and output energy steadily. However, such an energy storing set has disadvantages. Its biggest drawback is the insufficiency of spring torsion because of the conventional spiral springs used in the energy storing set. Therefore, the efficiency of energy storage is quite low. Another drawback is the single-directional input bearings because these bearings may be damaged easily if the magnitude of torsion that is input into the energy storing set becomes too great. Therefore, such an energy storing set may be used for small-size energy sources and can not be used for large-size energy sources, such as a power plant.

To eliminate these disadvantages, the inventor of the present invention has put a lot of effort into the subject and has successfully come up with the energy storing device of the present invention.

SUMMARY OF THE INVENTION

The main object of the present invention is to provide an energy storing device that may be used for various types of energy generating units to store energy through spring torsion and may release energy when an energy generating unit stops supplying energy.

A second object of the present invention is to provide an energy storing device that may maintain a steady energy output.

A third object of the present invention is to provide an energy storing device that has a high efficiency of energy storage and takes up a limited amount of space.

To reach the objects, the energy storing device of the present invention is disclosed. In the energy storing device of the present invention, energy from an energy generating unit is stored in the form of spring torsion and then is output in a steady manner. The energy storing device of the present invention comprises a plurality of cog-wheels, a plurality of torsion magnitude limiting units, a plurality of single-directional input bearings, a plurality of energy storing units and a plurality of speed increasing cog-wheels. A rotational energy source is connected with the cog-wheels, and the torsion magnitude and direction of input energy are limited by the torsion magnitude limiting units and single-directional input bearings, respectively. Then, the input energy is stored in the energy storing units through the compression of the springs. The energy in the form of the compression may be output through the speed increasing cog-wheels. If the torsion magnitude exceeds a pre-determined value of the torsion magnitude limiting units, the torsion magnitude limiting units would interrupt the input of the torsion by the way of idling to prevent the damage of the energy storing units. The single-directional input bearings only allow the single-directional passage of the torsion from each of the twisting force limiting units to the energy storing units, to prevent passage of the torsion in the opposite direction so as to protect the torsion magnitude limiting units and cog-wheels. Each of the energy storing units includes at least two end rotational disc portions, which are connected with each other co-axially. A leaf spring unit is provided between each pair of rotational disc portions, and one end of the leaf spring units is bent in an opposite direction (opposite to the winding direction of the leaf spring) and is retained in a retaining groove to increase its torsion. The speed increasing cog-wheels are connected with the output end rotational disc portions to increase the rotational speed, so as to output the energy. In addition, the energy storing units may be connected in series or in parallel to increase the efficiencies in energy storage and energy output.

LIST OF REFERENCE NUMERALS

1 Energy storing device
11 Cog-wheels
12 Torsion magnitude limiting units
13 Single-directional input bearings
14 Energy storing units
140 Middle rotational disc portions
141 Leaf spring units
142 Input end rotational disc portions
143 Output end rotational disc portions
144 Central retaining portions
145 Inner retaining grooves
146 Outer retaining grooves
147 Inner ends
148 Outer ends
149 Wavy pattern
15 Speed increasing cog-wheels
16 Energy input end
17 Energy output end
2 Energy generating unit
21 Wind speed measuring device
3 Generator
4 Computer control unit
51 Clutch
52 Flywheel
53 Transmission box
61 Electromagnetic brake
62 Continuous speed varying box
63 Speed control unit
64 Flywheel
65 Clutch

DETAILED DESCRIPTION OF THE PREFERRED EMBODIMENT

Figure 1:
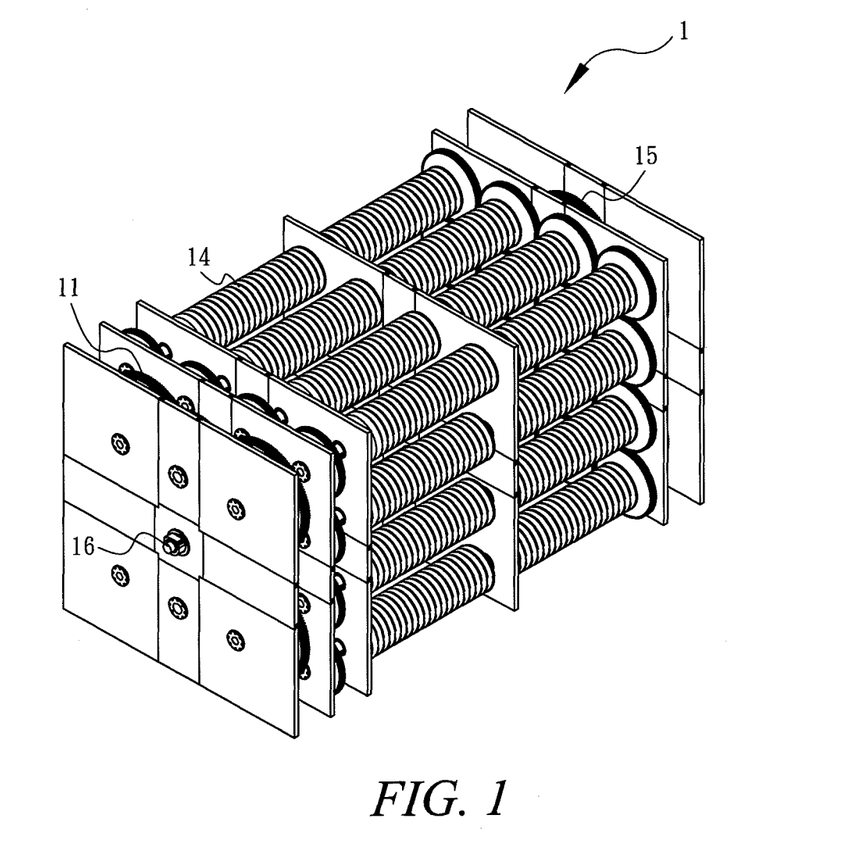
FIG. 1 is a perspective view of the energy storing device of the present invention.
Figures 2, 2A:
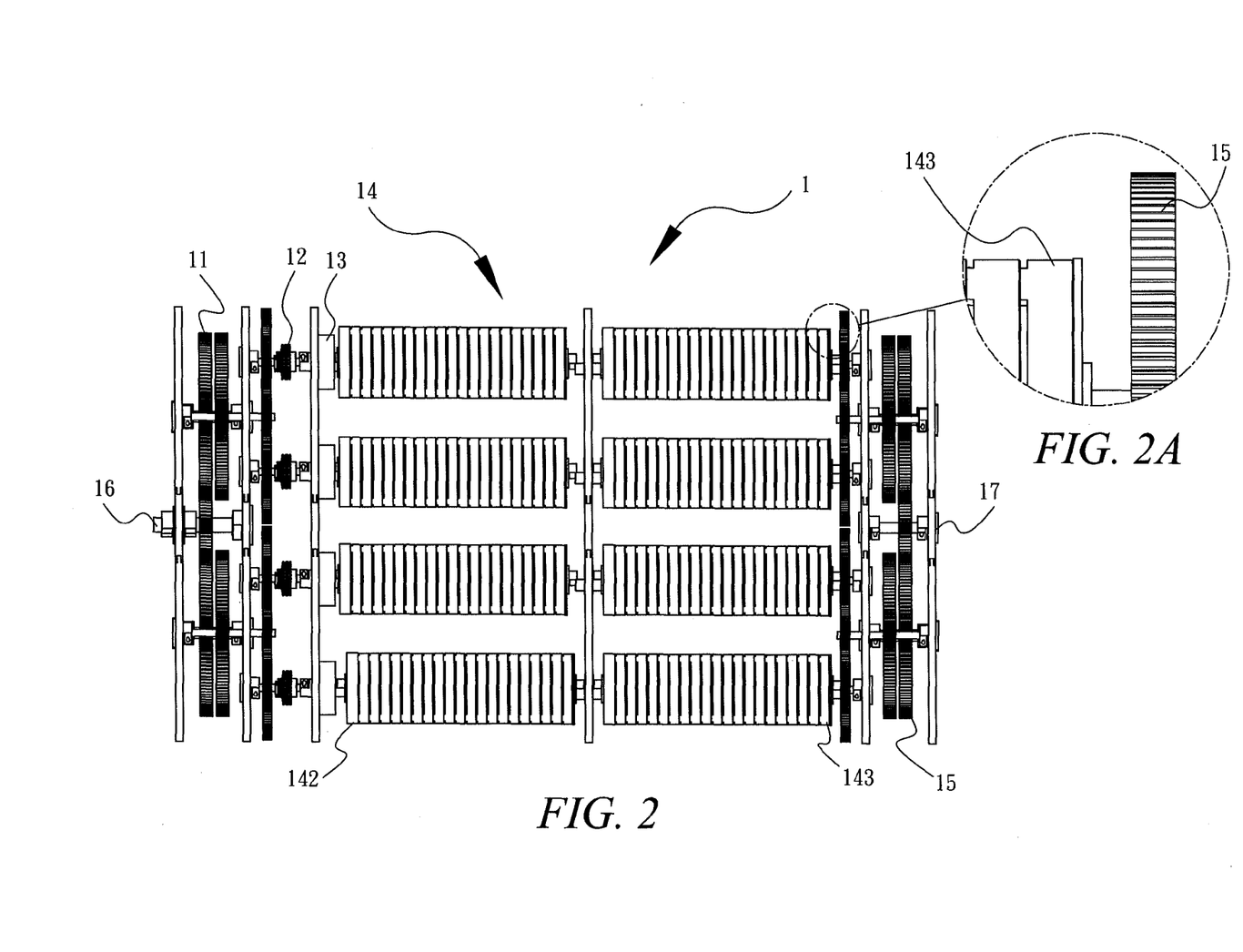
FIG. 2 is a side view of the energy storing device of the present invention.
FIG. 2A is an enlarged view illustrating how an output end rotational disc portion is connected with the speed increasing cog-wheels.
Figure 3:
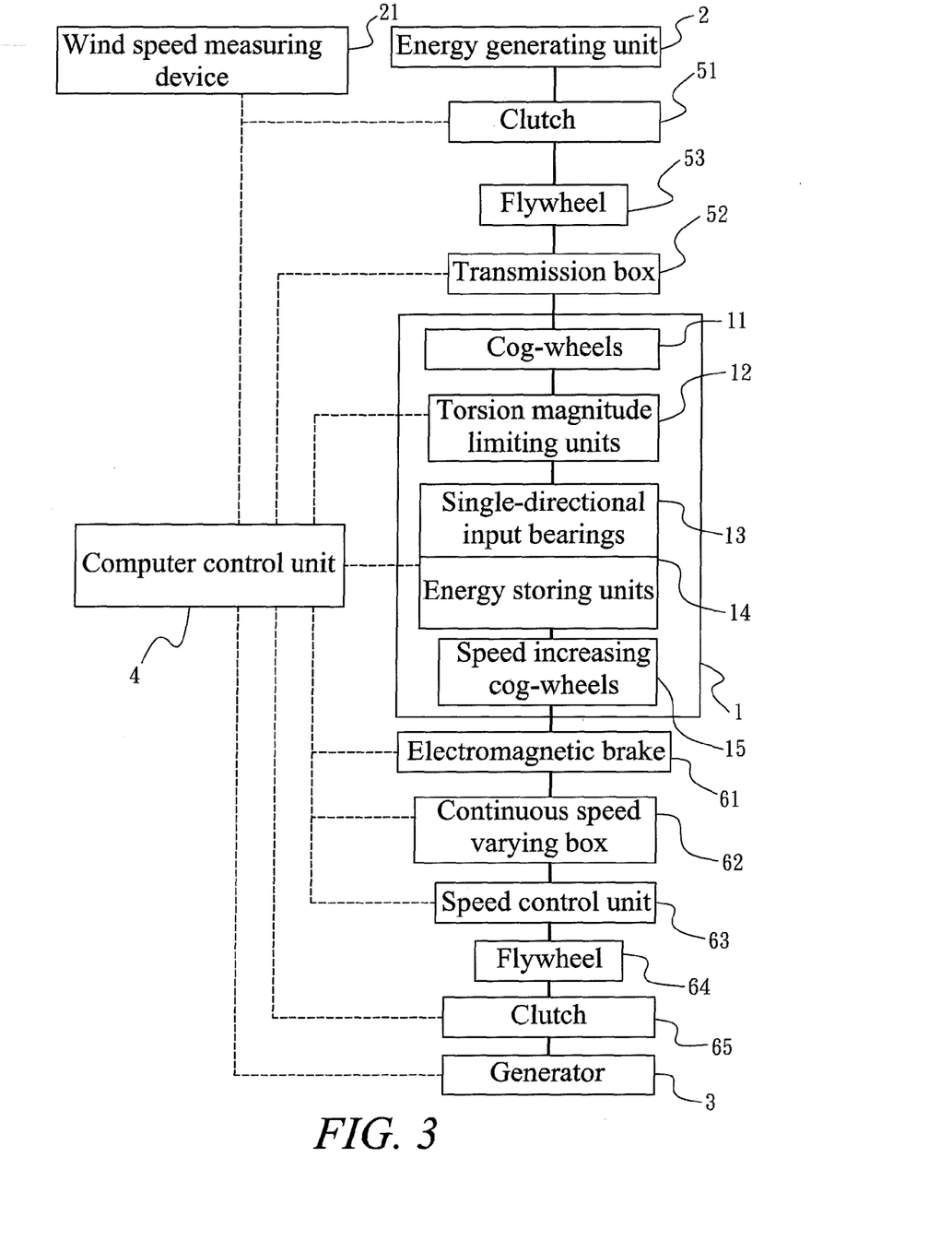
FIG. 3 is a block diagram illustrating the use of the energy storing device of the present invention in a wind turbine system.
Figure 4:
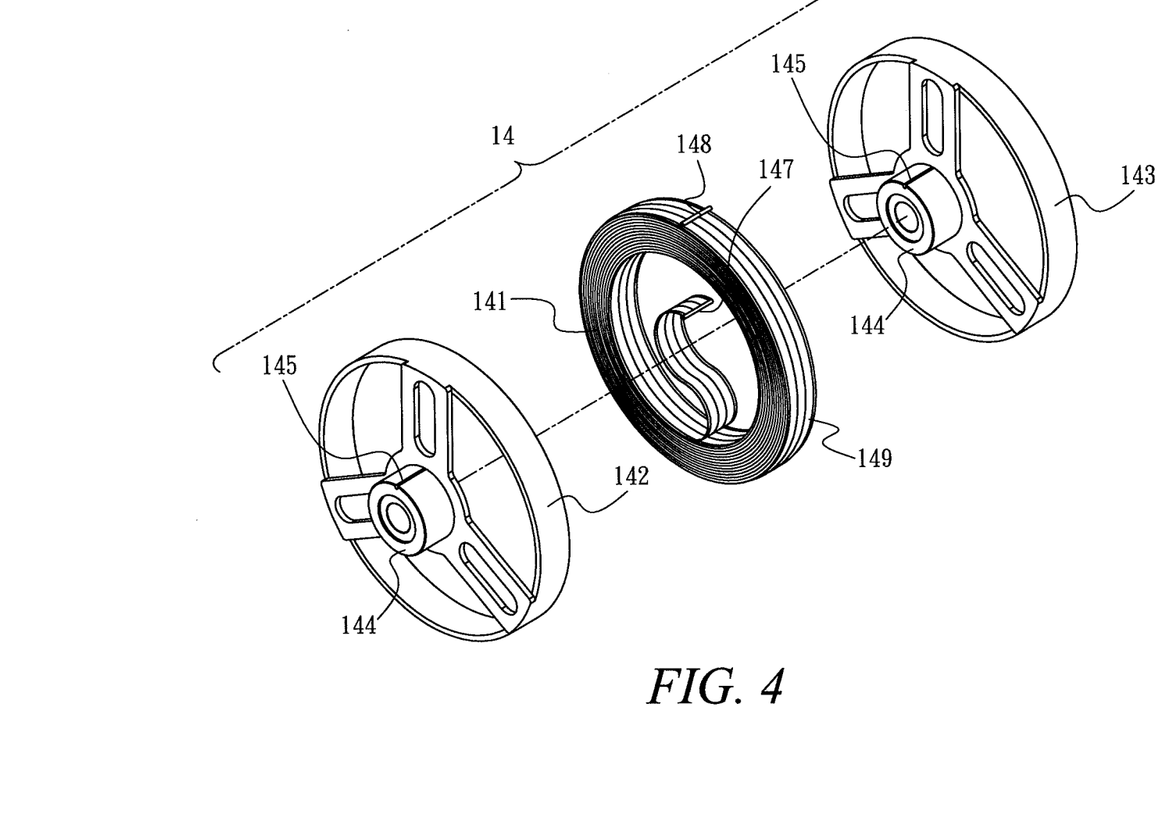
FIG. 4 is an exploded view illustrating how a leaf spring unit is connected with an end rotational disc portion in the first type of connective method.
Figure 5:
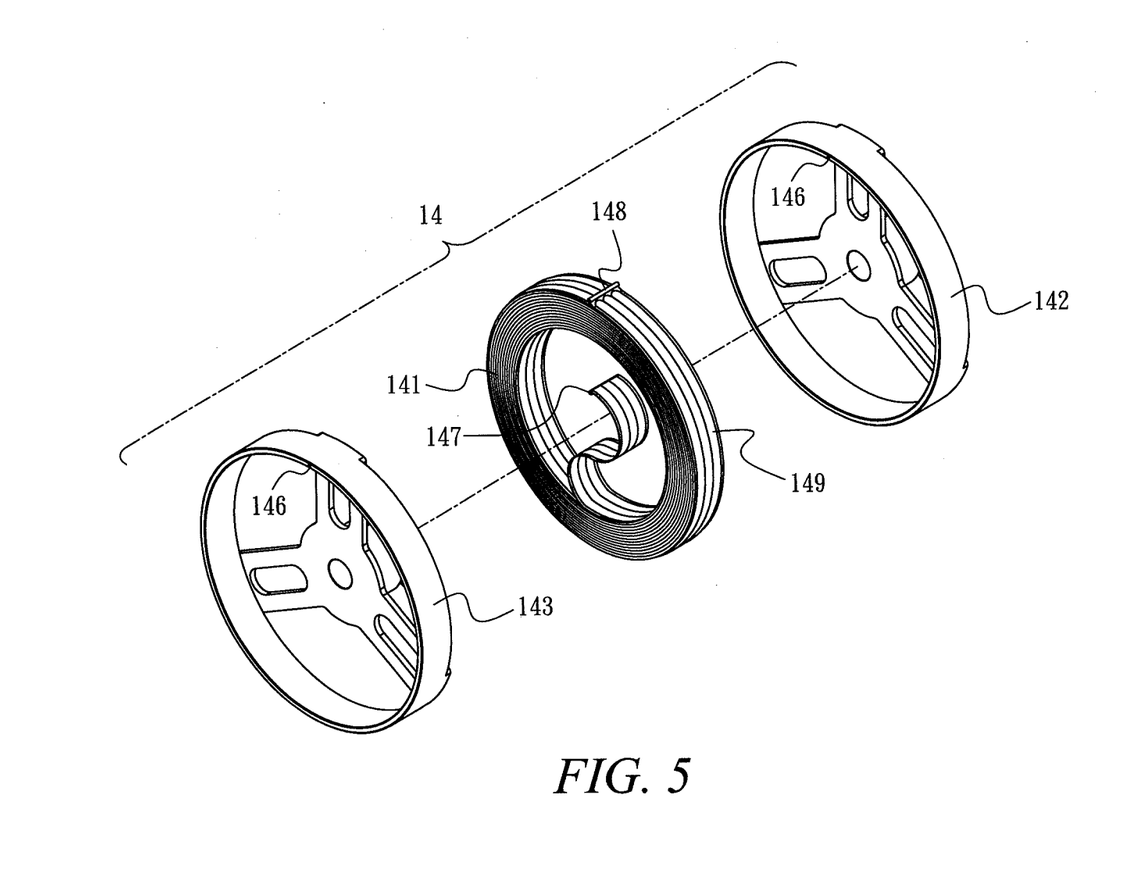
FIG. 5 is another exploded view illustrating how a leaf spring unit is connected with an end rotational disc portion in the first type of connective method.
Figure 6:
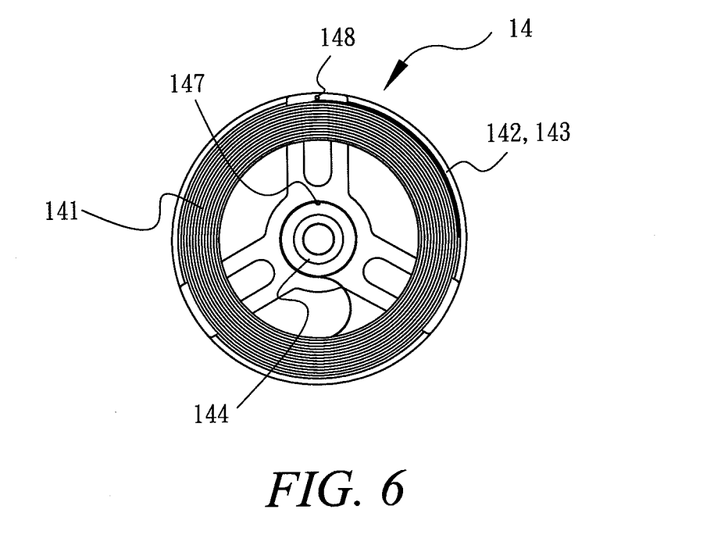
FIG. 6 is a longitudinal view illustrating how leaf spring units are disposed in an energy storing unit in the first type of connective method.
Figure 7:
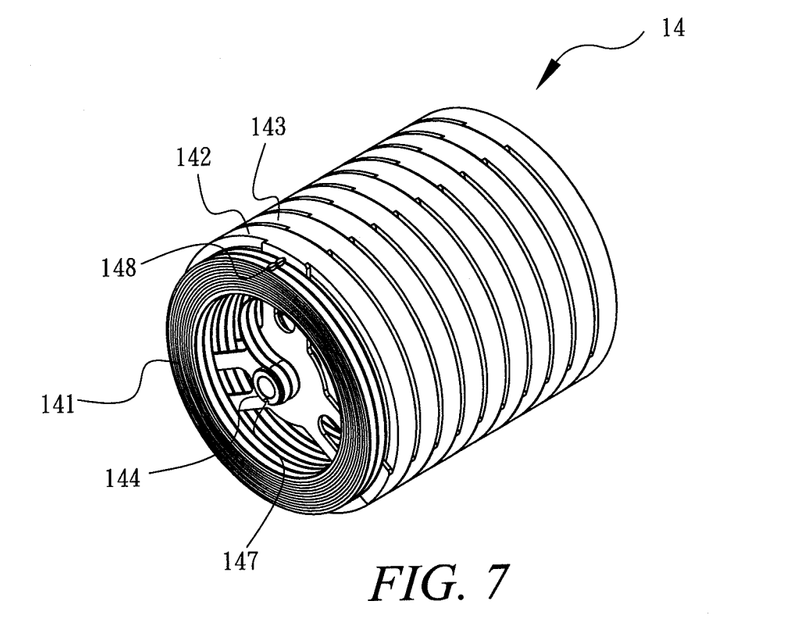
FIG. 7 is a perspective view illustrating how leaf spring units are disposed in an energy storing unit in the first type of connective method.
Figure 8:
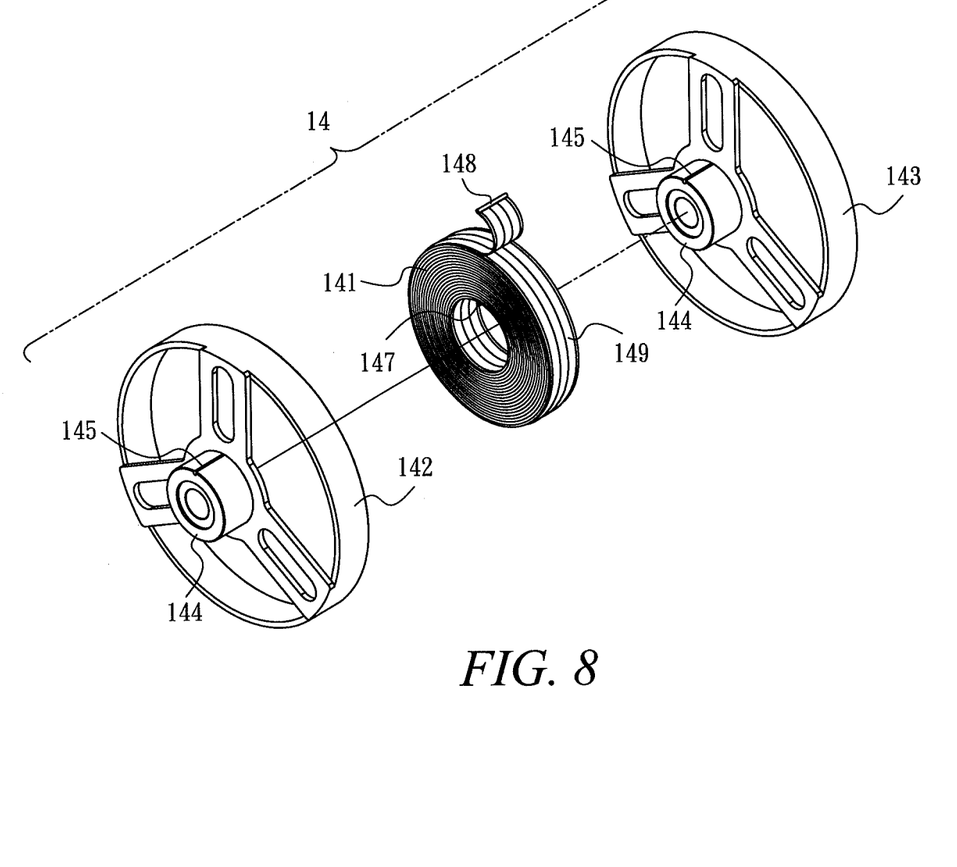
FIG. 8 is an exploded view illustrating how a leaf spring unit is connected with an end rotational disc portion in the second type of connective method.
Figure 9:
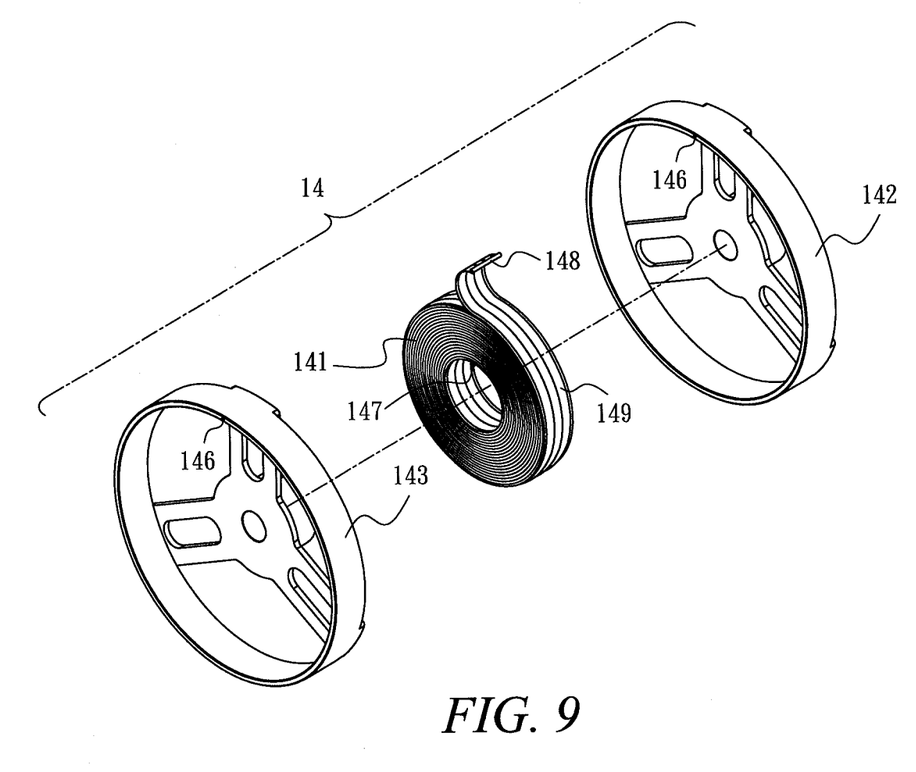
FIG. 9 is another exploded view illustrating how a leaf spring unit is connected with an end rotational disc portion in the second type of connective method.
Figure 10:
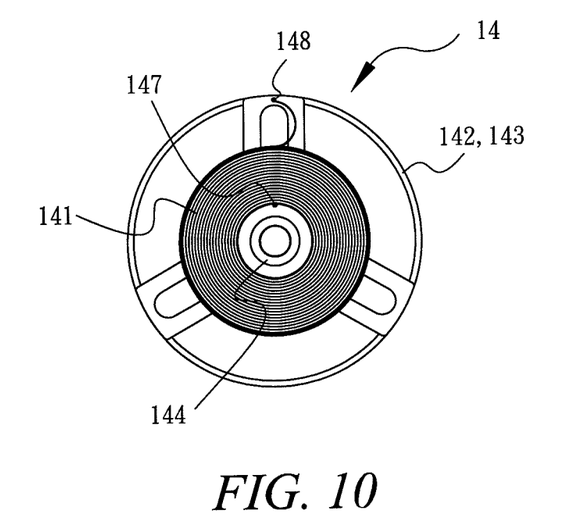
FIG. 10 is a longitudinal view illustrating how leaf spring units are disposed in an energy storing unit in the second type of connective method.
Figure 11:
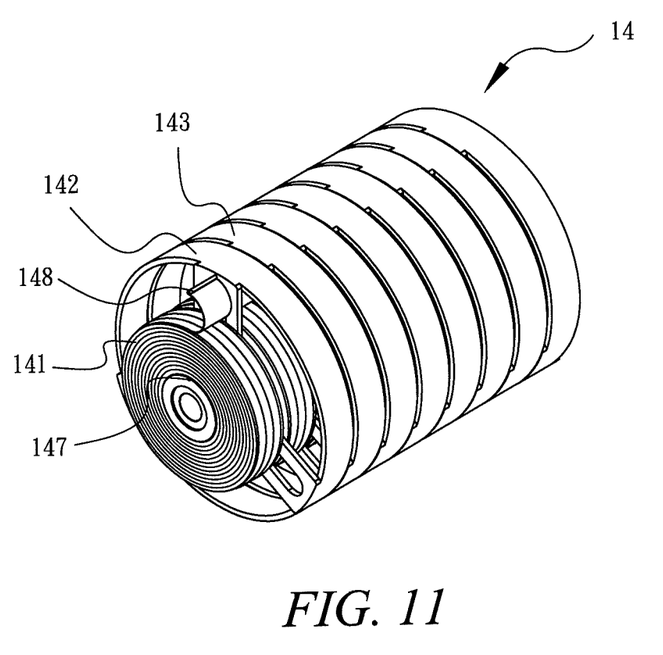
FIG. 11 is a perspective view illustrating how leaf spring units are disposed in an energy storing unit in the second type of connective method.

Please see FIGS. 1 to 3, which illustrate the energy storing device 1 of the present invention. The energy storing device 1 of the present invention comprises a plurality of cog-wheels 11, a plurality of torsion magnitude limiting units 12, a plurality of single-directional input bearings 13, a plurality of energy storing units 14 and a plurality of speed enhancing cog-wheels 15. An energy source is connected with the cog-wheels 11 and the torsion magnitude and direction of input energy are limited by the torsion magnitude limiting units 12 and single-directional input bearings 13, respectively. Then, the input energy is stored in the energy storing units 14 through spring torsion. The stored energy may be output through the speed enhancing cog-wheels 15.

In detail, first, when the energy is input, the torsion prompts the cog-wheels 11 to rotate. Then, if the magnitude of the torsion exceeds a pre-determined value of the torsion magnitude limiting units 12, the torsion magnitude limiting units 12 would interrupt the input of the torsion through idling to prevent the damage of the energy storing units 14. Each of single-directional input bearings 13 is connected with the output end of the corresponding torsion magnitude limiting device 12 and only allows the single-directional passage of the torsion from each of the torsion magnitude limiting units 12 to the corresponding energy storing set 14, preventing passage of the torsion in the opposite direction so as to protect the torsion magnitude limiting units 12 and cog-wheels 11. Each of the energy storing units 14 includes at least two end rotational disc portions 142 and 143, which are connected with each other co-axially. A leaf spring unit 141 is provided between each pair of end rotational disc portions 142 and 143. In addition, one end of the leaf spring unit 141 is bent in an opposite direction. The input end of each rotational disc portion 142 is connected with the output end of the corresponding single-directional input bearing 13, and the output end of rotational disc portions 143 is connected with the speed increasing cog-wheels 15 (please see FIG. 2A). When the speed enhancing cog-wheels 15 are inactivated, the rotational disc portions 143 would remain still. Therefore, each rotational disc portion 142 may rotate with respect to the corresponding rotational disc portion 143. When the speed enhancing cog-wheels 15 are activated, the torsion stored in the rotational disc portions 143 may be sped up and then output.

As illustrated in FIG. 2, the energy storing device 1 of the present invention is actually a part of a larger energy supplying system. In this embodiment, the system is a wind turbine. An energy generating unit 2 that may receive rotational energy from wind, water, human or other types of sources is connected with an energy input end 16 of the energy storing device 1. A clutch 51 is provided between the energy input end 16 and the energy generating device 2, and a wind speed measuring device 21 may also be provided so as to determine the activation of the clutch 51 according to the magnitude of the rotational speed. In addition, a transmission box 53 and a flywheel 52 are provided between the energy input end 16 and the clutch 51. The flywheel 52 is provided to stabilize the energy output of the energy generating device 2, and the transmission box 53 is provided to reduce the rotational speed of the energy generating device 2 so as to increase the magnitude of the torsion. As illustrated in FIG. 3, an electromagnetic brake 61, a continuous speed varying box 62, a speed control unit 63, a flywheel 64, a clutch 65 and a generator 3 are provided in the left to right order in FIG. 3. The electromagnetic brake 61 is provided to reduce or stop the energy output of the speed increasing cog-wheels 15. The continuous speed varying box 62 is provided to maintain the rotational speed of the energy output. The speed control unit 63 is provided to control the rotational speed of the energy output. The flywheel 64 is provided to stabilize the energy output. The clutch 65 is provided to control the passage of the energy output to the generator 3.

The clutch 51, wind speed measuring device 21, transmission box 53, torsion magnitude limiting units 12, energy storing units 14, electromagnetic brake 61, continuous speed varying box 62, speed control unit 63, clutch 65 and generator 3 are connected with a computer control unit 4 to control the overall operation.

As illustrated from FIGS. 4 to 11, to enhance the energy storing efficiency, each leaf spring unit 141 has an opposite-direction bending design. A central retaining portion 144 is centrally provided in each input end rotational disc portion 142 and 143. An outer retaining groove 146 is provided at an outer position of each rotational disc portion 142 and 143, and an inner retaining groove 145 is provided in each central retaining portion 144. The inner end 147 of each leaf spring unit 141 is retained in the inner retaining groove 145, and the outer end 148 of each leaf spring unit 141 is bent in an opposite direction and retained in the outer retaining groove 146. There are two types of connective methods for the leaf spring units 141. In the first type, the inner end 147 of each leaf spring unit 141 is first retained in the inner retaining groove 145, and then the outer end 148 is bent in an opposite direction (i.e., opposite to the winding direction of the leaf spring) and is retained the outer retaining groove 146. In the second type, the outer end 148 of each leaf spring unit 141 is first retained in the outer retaining groove 146 and then the inner end 147 is bent in an opposite direction (i.e., opposite to the winding direction of the leaf spring) and is retained the inner retaining groove 145. Therefore, a plurality of rotational disc portions 142 and 143 may be linked up by the leaf spring units 141 so as to enhance the energy storing efficiency. In addition, a wavy pattern 149 may be provided on the surface of each leaf spring unit 141 so as to enhance its energy storing efficiency.

Figure 12:
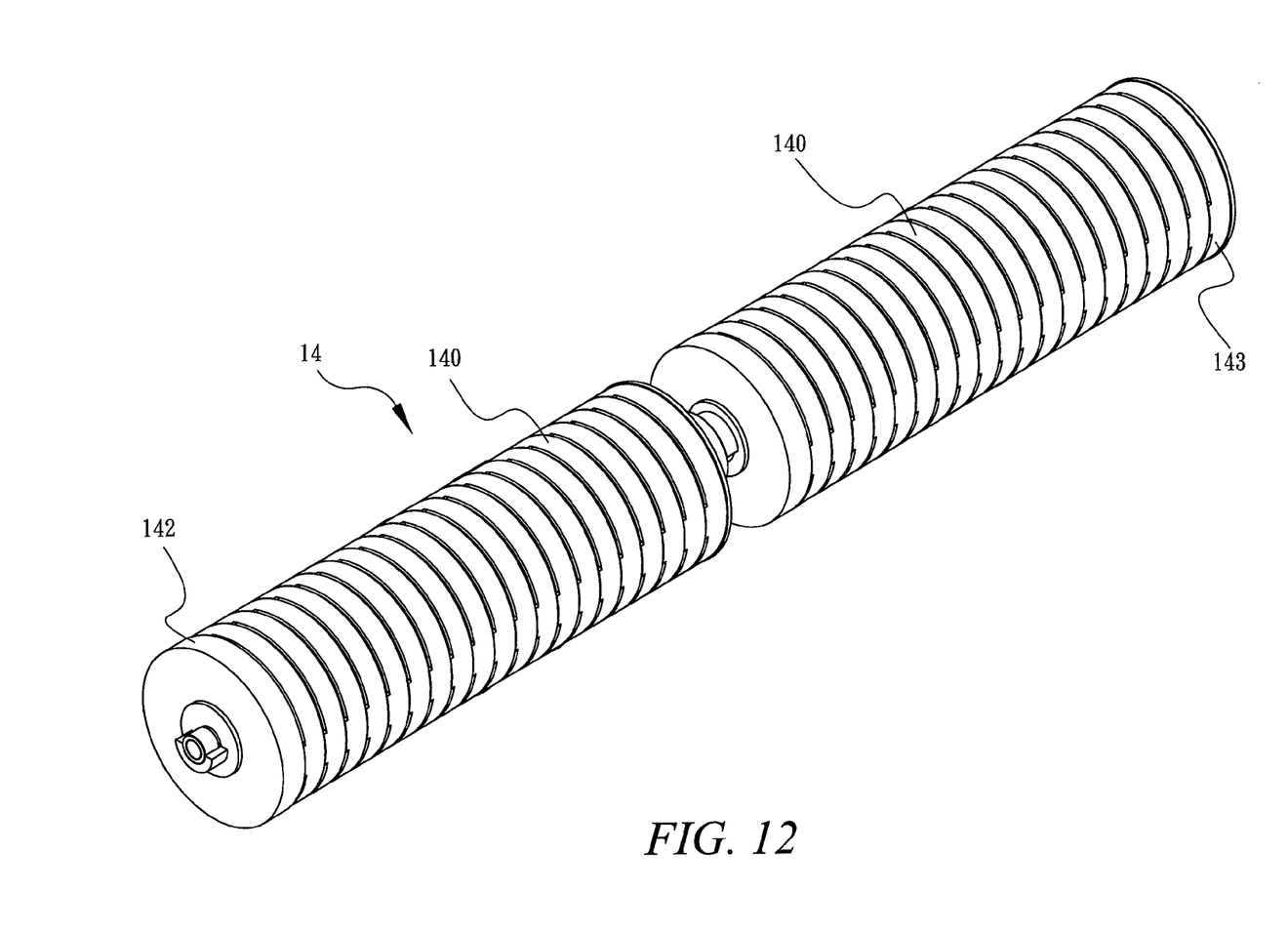
FIG. 12 is a perspective view illustrating how the energy storing units are connected in series.

As illustrated in FIG. 12, a plurality of middle rotational disc portions 140 are co-axially provided between each pair of end rotational disc portions 142 and 143. Each input end rotational disc portion 142 at the input end is connected with the output end of the single-directional input bearings 13, and each output end rotational disc portion 143 at the output end is connected with the speed increasing cog-wheels 15. Also a leaf spring unit 141 is provided between each input end rotational disc portion 142 and each middle rotational disc portion 140, as well as between each middle rotational disc portion 140 and each output end rotational disc portion 143. When the speed increasing cog-wheels 15 are inactivated, the speed increasing cog-wheels 15 may lock up the output end rotational disc portions 143 so as to allow the input end rotational disc portions 142 to rotate and thus store energy. In the mean time, the leaf spring units 141 would cause the middle rotational disc portions 140 to rotate so as to store the energy until no energy can be input. When the speed increasing cog-wheels are activated, the output end rotational disc portions 143 may cause the middle rotational disc portions 140 and the input end rotational disc portions 142 to rotate to speed up the output of energy through the leaf spring units 141.

Figure 13:
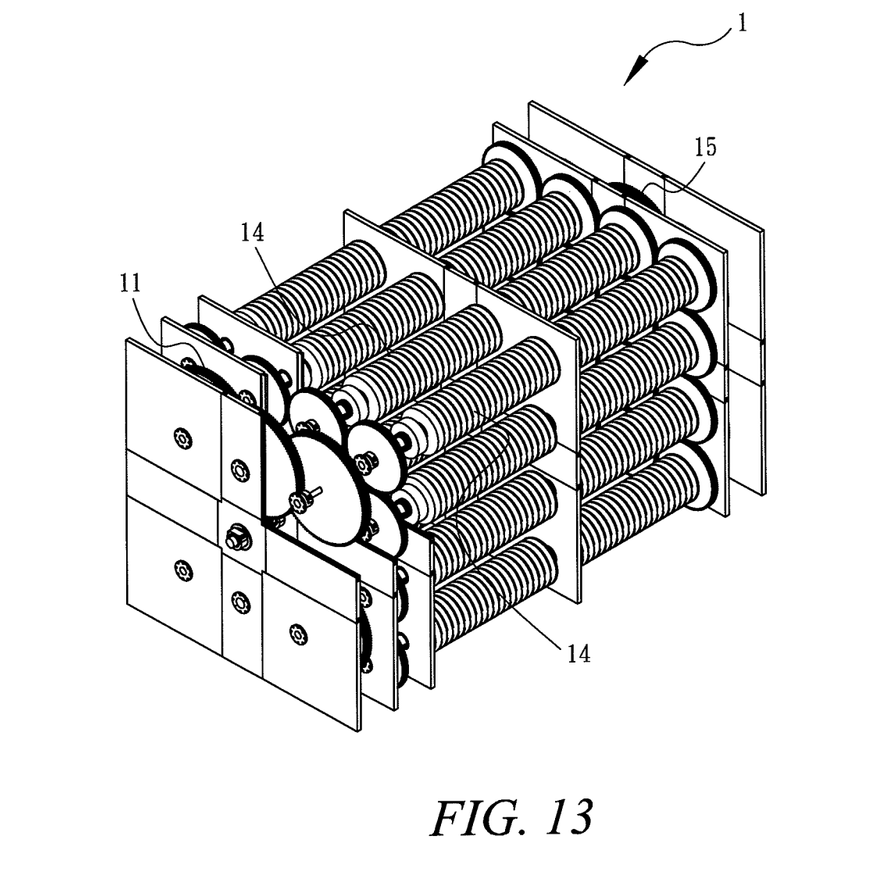
FIG. 13 is a perspective view illustrating how the energy storing units are connected in parallel.

FIG. 13 illustrates another embodiment. The energy storing units 14 may be arranged in parallel, and the cog-wheels may distribute the energy to the energy storing units 14. Also, energy may be output through the speed increasing cog-wheels 15. In addition, each of the energy storing units 14 has its own torsion magnitude limiting unit 12 and single-directional input bearing 13.

The energy storing device of the present invention has the following advantages:

1. The energy storing device of the present invention may be used for various types of energy generating units to store energy through spring torsion. In addition, the energy storing device may release energy when an energy generating unit stops supplying energy and may store energy when an energy generating unit supplies energy so as to maintain a continuous energy output.
2. In the energy storing device of the present invention, a steady energy output may be maintained: energy generated by an energy generating unit is first input into the energy storing device of the present invention and then is output in a steady magnitude through the adjustment of proper rotational speed.
3. The energy storing device of the present invention has a high efficiency of energy storage and takes up a limited amount of space. Therefore, the device of the present invention is quite useful.
4. The energy storing device of the present invention may be used inside motor vehicles, electric fans, shaver, toy cars and other devices that utilizes rotational energy. The device of the present invention may also be used with a small power generator to enable such small generator to be used as an emergency energy source in home or in the outdoor.
5. In the energy storing device of the present invention, energy may be input manually; the device may be used with a sports device, such as a bicycle. Therefore, energy may be gradually accumulated and then be converted to a steady, greater energy output.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

FIG. 3

2 Energy generating unit (wind turbine)
51 Clutch
53 Flywheel
2 Transmission box
11 Cog-wheels
12 Torsion magnitude limiting units
13 Single-directional input bearings
14 Energy storing units
1 Energy storing device
15 Speed increasing cog-wheels
61 Electromagnetic brake
62 Continuous speed varying box
63 Speed control unit
64 Flywheel
65 Clutch
3 Generator
21 Wind speed measuring device
4 Computer control unit

What is claimed is:
1. An energy storing device in which energy is stored through spring torsion, comprising:
a plurality of cogwheels, wherein the plurality of cogwheels is connected to an energy source and each input end of the cog-wheels is connected with the energy source, which is in the form of a rotational force and the energy output from the cog-wheels is in the form of a torsion;

a plurality of torsion magnitude limiting units, connected with the output ends of the cog-wheels, wherein if the magnitude of the torsion exceeds a pre-determined value of the torsion magnitude limiting units, the torsion magnitude limiting units would interrupt the torsion by the way of idling to prevent the damage of the energy storing units;

a plurality of single-directional input bearings, connected with the output ends of the torsion magnitude limiting units to only allow the single-directional passage of the torsion from each of the torsion magnitude limiting units to the corresponding energy storing set and to prevent the passage of the rotational force in a direction that is opposite from a direction of the single-directional passage so as to protect the torsion magnitude limiting units and cog-wheels;

a plurality of energy storing units, wherein each of the energy storing units includes at least two rotational disc portions, which are connected with each other co-axially, and a torsion spring unit is provided between each pair of rotational disc portions, characterized in that the two ends of each torsion spring unit are connected with a central retaining portion and a retaining groove and one end of the each torsion spring unit is bent in a direction that is opposite from a direction in which the torsion spring unit is wound so as to increase the energy storage efficiency, wherein the plurality of cog-wheels are not in direct contact with any of the rotational disc portions and wherein each of the plurality of cog-wheels is mounted on an axle upon which none of the plurality of energy storing units is mounted; and a plurality of speed increasing cog-wheels, connected with the output end rotational disc portions, wherein the speed increasing cog-wheels lock up the rotational disc portions when the speed increasing cog-wheels are inactivated so as to allow the rotational disc portions at the output ends of the energy storing units to rotate and thus store energy and the speed increasing cog-wheels increase the rotational speed of the output end rotational disc portions to output the energy when the speed increasing cog-wheels are activated.

2. The energy storing device as in claim 1, wherein the cog-wheels are connected with an energy generating unit, which acts as an energy source, and a clutch, a flywheel and a transmission box are provided between the energy generating unit and the cog-wheels, characterized in that the clutch is provided to control the passage of the energy from the energy generating unit to the transmission box, the flywheel is provided to stabilize the energy output of the energy generating unit through rotational inertia and the transmission box is provided to reduce the rotational speed of the energy generating unit so as to increase the magnitude of the torsion so as to facilitate the storage of energy.

3. The energy storing device as in claim 1, wherein the output ends of the speed increasing cog-wheels are connected with a generator and an electromagnetic brake, a continuous speed varying box, a speed control unit, a flywheel and a clutch are provided between the speed increasing cog-wheels and the generator, characterized in that the electromagnetic brake is provided to reduce or stop the energy output of the speed increasing cog-wheels, the continuous speed varying box is provided to maintain the rotational speed of the energy output, the speed control unit is provided to control the rotational speed of the energy output and the flywheel is provided to stabilize the energy output and wherein the clutch is provided to control the passage of the energy output to the generator.

4. The energy storing device as in claim 1, wherein a central retaining portion is centrally provided in each rotational disc portion, and wherein an outer retaining groove is provided at an outer position of each rotational disc portion and an inner retaining groove is provided in each central retaining portion, characterized in that the inner end of each torsion spring unit is retained in the inner retaining groove and the outer end of each torsion spring unit is bent a direction that is opposite from a direction in which the torsion spring unit is wound and retained in the outer retaining groove.

5. The energy storing device as in claim 1, wherein a central retaining portion is centrally provided in each rotational disc portion, and wherein an outer retaining groove is provided at an outer position of each rotational disc portion and an inner retaining groove is provided in each central retaining portion, characterized in that the outer end of each torsion spring unit is retained in the outer retaining groove and the inner end of each torsion spring unit is bent in a direction that is opposite from a direction in which the torsion spring unit is wound and retained in the inner retaining groove.

6. The energy storing device as in claim 1, wherein a pattern of peaks and troughs is provided on the surface of each torsion spring unit so as to enhance its energy storing efficiency.

7. The energy storing device as in claim 1, wherein a plurality of middle rotational disc portions are co-axially provided between each of the pair of end rotational disc portions, and wherein each input end rotational disc portion is connected with the output end of the single-directional input bearings and each output end rotational disc portion is connected with the speed increasing cog-wheels, and wherein a torsion spring unit is provided between each input end rotational disc portion and each middle rotational disc portion as well as between each middle rotational disc portion and each output end rotational disc portion, characterized in that when the speed increasing cog-wheels are inactivated, the speed increasing cog-wheels lock up the output end rotational disc portions so as to allow the input end rotational disc portions to rotate and store energy and that in the mean time, the torsion spring units would cause the middle rotational disc portions to rotate so as to store the energy and that when the speed increasing cog-wheels are activated, the output end rotational disc portions cause the middle rotational disc portions and the input end rotational disc portions to rotate to speed up the output of energy through the torsion spring units.

8. The energy storing device as in claim 1, wherein the energy storing units are arranged in parallel so that the cog-wheels distribute the energy to the energy storing units, and wherein energy is output through the speed increasing cog-wheels, characterized in that each of the energy storing units has its own torsion magnitude limiting unit and single-directional input bearing.

\* \* \* \* \*